United States Patent
Holcomb et al.

(10) Patent No.: US 7,409,128 B2
(45) Date of Patent: Aug. 5, 2008

(54) PUMPING ARRANGEMENT FOR FIBER AMPLIFIERS WITH REDUCED REFLECTIVE FEEDBACK

(75) Inventors: Douglas P Holcomb, Morris Plains, NJ (US); Andrew John Stentz, Clinton, NJ (US); Stephan F Wielandy, Hillsborough, NJ (US); Paul F Wysocki, Flemington, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/169,338

(22) Filed: Jun. 29, 2005

(65) Prior Publication Data

US 2007/0003196 A1 Jan. 4, 2007

(51) Int. Cl.
G02B 6/44 (2006.01)
G02B 6/26 (2006.01)
H01S 3/30 (2006.01)

(52) U.S. Cl. .................... 385/115; 385/28; 385/27; 372/6

(58) Field of Classification Search .............. 385/115, 385/28; 372/6
See application file for complete search history.

(56) References Cited

U.S. PATENT DOCUMENTS

| 5,864,644 | A | 1/1999 | DiGiovanni et al. ........ 385/43 |
| 6,104,733 | A * | 8/2000 | Espindola et al. ........... 372/6 |
| 6,397,636 | B1 | 6/2002 | DiGiovanni et al. ........ 65/395 |
| 6,430,343 | B1 * | 8/2002 | Arney et al. ............... 385/48 |
| 6,434,295 | B1 * | 8/2002 | MacCormack et al. ....... 385/27 |
| 6,434,302 | B1 * | 8/2002 | Fidric et al. ............... 385/43 |
| 6,823,117 | B2 * | 11/2004 | Vakili et al. ............... 385/43 |
| 7,046,432 | B2 * | 5/2006 | Starodoumov .......... 359/341.32 |
| 2002/0054740 | A1 * | 5/2002 | Vakili et al. ............... 385/115 |
| 2004/0196537 | A1 * | 10/2004 | Starodoumov ........... 359/341.3 |
| 2005/0207454 | A1 * | 9/2005 | Starodoumov et al. ......... 372/4 |

* cited by examiner

Primary Examiner—Kianni C Kaveh (57) ABSTRACT

An improved tapered fiber bundle (TFB), or assembly including a TFB, mitigates undesirable reflections from optical discontinuities at the input ends of the multimode fibers of the TFB by suppressing the coupling of signal light into modes that can produce undesired reflections. Means are provided for managing the mode field of injected signal light so that it remains substantially confined to the core of the central TFB fiber until it is past the region where it can interact with the multimode fibers of the TFB.

5 Claims, 5 Drawing Sheets

PUMPING ARRANGEMENT FOR FIBER AMPLIFIERS WITH REDUCED REFLECTIVE FEEDBACK

FIELD OF THE INVENTION

This invention relates to tapered fiber bundles and to their use in directing pump light into cladding-pumped fiber optical amplifers.

ART BACKGROUND

Optical amplifiers using cladding-pumped fibers (CPFs) are useful for amplifying optical signals to powers of several watts or more. In a typical arrangement for optical amplification, the refractive index of the CPF exhibits a radial profile that defines a pair of concentric waveguiding regions.

Light at the signal wavelength, which is to be amplified, is confined to an inner waveguide defined by the core and inner cladding of the fiber. The inner cladding is defined in the glass fiber and juxtaposed to the core. The core is doped with an active species such as erbium or another rare-earth element which is effective for providing amplification when appropriately pumped.

Pump radiation is confined to an outer waveguide defined by the inner cladding mentioned above, together with an outer cladding. The outer cladding is typically a low-refractive-index polymer layer overcoated onto the glass inner cladding mentioned above. In alternative arrangements, the outer cladding may be a further layer of glass, or even air or another ambient atmosphere, or the core and inner cladding could be composed of another material such as a polymer. The fiber dimensions and the index profile are typically arranged to provide a relatively high numerical aperture (NA)—typically about 0.45—as well as a relatively large diameter for the outer waveguide. These features promote the efficient coupling of pump light into the outer waveguide from semiconductor diode pump lasers.

It is often desirable to pool pump light from multiple laser diodes. A tapered fiber bundle (TFB) is one arrangement useful for this purpose. The TFB is a close-packed array of optical fibers that are fused together and and tapered down to a diameter that matches the inner cladding diameter of the CPF. TFBs are described, for example, in U.S. Pat. No. 5,864,644, commonly assigned herewith.

In a bundle of, e.g., seven fibers, six large-core multimode (MM) fibers are typically packed around a central fiber that is single mode or at most supports a few optical modes, and that is used to guide signal light through the bundle. The input (i.e., the unfused) end of each of the MM fibers is typically fusion spliced to the pigtail from a respective laser diode. Collectively, the MM fibers combine the pump light from their respective laser diodes and deliver it to the output (fused) end of the bundle, and from there into the CPF.

In typical arrangements, the input (unfused) end of the central fiber is fusion spliced to a standard single-mode fiber, or other suitable fiber, that delivers the input signal.

The output (fused) end of the bundle is typically fusion spliced to an output fiber pigtail structured to have concentric inner and outer waveguides. At the output end of the bundle, the central fiber of the bundle also effectively has an inner waveguide, which is matched to the inner waveguide of the pigtail. The outer waveguide of the pigtail is matched to the outer diameter of the entire bundle (at the fused end), and also matched to the outer waveguide of the CPF.

In practice, TFB-CPF assemblies may be arranged such that relative to the signal light, the pump light is co-propagating, counter-propagating, or both.

One problem that is known to occur in amplifiers of the CPF type is uncontrolled lasing. When uncontrolled lasing occurs, it can disrupt the output signal from the amplifier, and can even damage the amplifier or other components. Uncontrolled lasing can be initiated by reflections at the signal wavelength, or at other wavelengths, that reenter the CPF.

It is desirable to find ways to mitigate uncontrolled lasing that may occur when cladding-pumped fibers are spliced to tapered fiber bundles.

SUMMARY OF THE INVENTION

One source of undesirable reflections is optical discontinuities at the input ends of the MM fibers of the bundle. That is, the interfaces between the fiber ends and the ambient atmosphere, or between the fiber ends and the output facets of the laser diodes, are capable of reflecting a significant amount of signal light back toward the gain medium if this light is somehow allowed to enter the MM fibers and reach the optical discontinuities at their ends.

Such reflections cannot occur if signal light never enters the MM fibers, and they are not generally of concern if the signal light within the core of the CPF is limited to the fundamental core mode, and if when coupled into the TFB pigtail it remains limited to the fundamental core mode. However, in some cases it is desirable that the CPF core support more than one mode, and we have found that higher-order core modes (HOM) of the CPF can couple into outer waveguide modes of the TFB, and thence into the MM fibers. Even the fundamental core mode of the CPF can be coupled into outer waveguide modes of the TFB by an imperfect splice or other fiber perturbations.

We have found a way to suppress the coupling of signal light into modes that can produce undesired reflections.

In a broad aspect, our invention involves managing the mode field of the amplified signal light so that it remains substantially confined to the core of the central TFB fiber until it is past the region where it can interact with the multimode fibers of the TFB.

In specific embodiments of the invention, we modify the output pigtail of the TFB. Instead of the conventional pigtail fiber, which typically has the same core as a standard single-mode fiber, we use a fiber for the pigtail that supports a greater number of core modes than the CPF.

A fiber characteristic that is usefully considered in this regard is the V number. As well known, the V number is related to the numerical aperture (NA) of a fiber, the radius r of the core, and the signal wavelength $\lambda$ by the formula $V=(2\pi r/\lambda)\, NA$. It will in at least some cases be useful to select, for the output pigtail, a fiber that has a higher V number than the CPF. Although this is not a sufficient condition for the pigtail to support more nodes than the CPF, that will often be the case.

In alternate embodiments of the invention, the TFB pigtail is modified by adding an index pedestal near the core of the fiber. This increases mode-field confinement by providing an additional waveguiding region, near the core, for modes that are not substantially confined by the core. The index pedestal is a region, concentric with the core and adjacent thereto that has a refractive index less than that of the core, but greater than that of both the inner cladding material that surrounds the core and the outer cladding material.

In other alternate embodiments, the TFB is configured to contain, in the tapered region, an additional waveguiding region, near the center fiber and away from the MM fiber cores, to confine modes that are not substantially confined to the core of the pigtail fiber. In such a case, it will be advantageous to also modify the TFB output pigtail in one or more of the ways described above.

One such alternate embodiment would create an additional waveguiding region by adding an index pedestal to the central fiber of the TFB.

DETAILED DESCRIPTION

Figure 1:
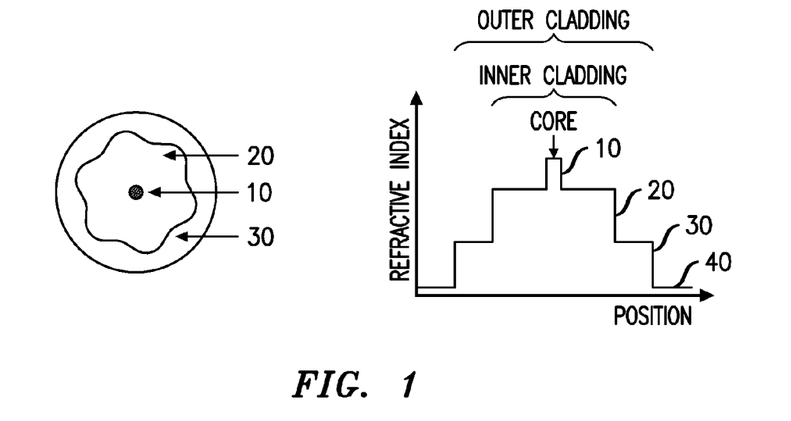
FIG. 1 schematically illustrates the refractive index profile of a typical cladding-pumped fiber (CPF) of the prior art.

FIG. 1 schematically illustrates the refractive index profile of a typical cladding-pumped fiber (CPF). It will be seen that the highest refractive index lies in core 10, with successively lower refractive indices in inner cladding 20 and outer cladding 30. Region 40 is typically air or other ambient atmosphere, and most commonly has the lowest refractive index as illustrated in FIG. 1.

Figure 2:
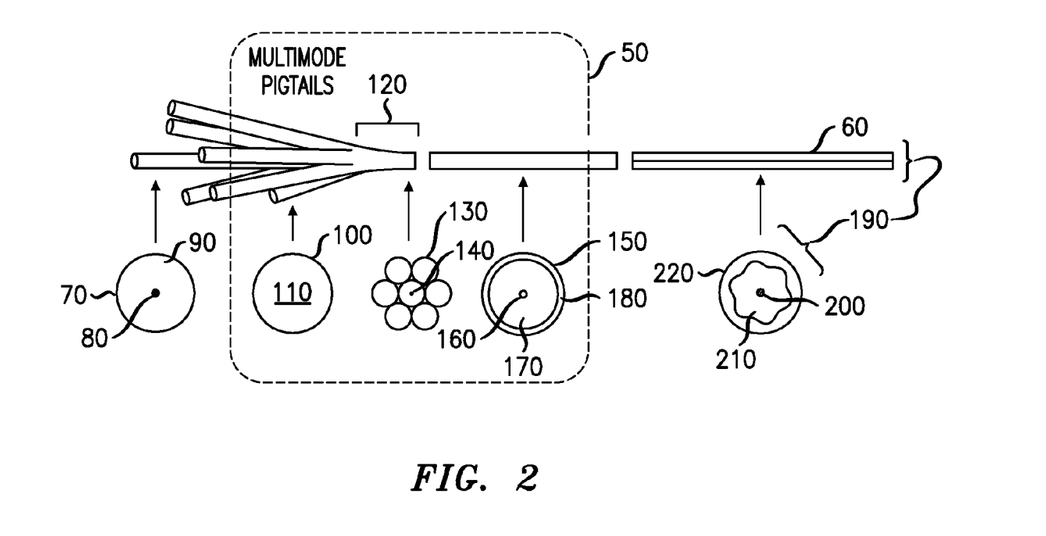
FIG. 2 schematically illustrates a tapered fiber bundle (TFB) assembled with a cladding pumped fiber as known in the prior art.

FIG. 2 schematically illustrates a tapered fiber bundle (TFB) 50 assembled with a CPF 60. Central TFB input fiber 70 is shown as having single-mode core 80 and cladding 90. Exemplary multimode (MM) fiber 100 is shown as having a large multimode core 1 10 and cladding 115. In the view illustrated, the signal to be amplified (not shown) is injected from the left-hand side of the figure, propagates through the assembly from left to right, and exits from the right-hand side of the figure.

Taper portion 120 is shown as a cluster of drawn-down MM fibers 130 fused to the drawn-down central fiber 140. TFB output pigtail 150 is shown as including core 160, inner cladding 170, and outer cladding 180. As mentioned above, that portion of pigtail 150 that functions as an inner waveguide is matched to that portion of taper 120, including in particular central fiber 140—that likewise functions as an inner waveguide.

CPF 60 is shown as having core 200, inner cladding 2 1 0, and outer cladding 220. Often, as shown in the figure, the inner cladding is made non-circular in cross section to suppress helical modes of the pump light. Such modes are undesirable because they are relatively ineffective for pumping. As noted above, that portion of pigtail 150 that functions as an outer waveguide is matched to the outer diameter of taper 120 and to that portion of CPF 60 that functions as an outer waveguide.

In practice, it is generally desirable for an operator of an assembly such as that shown in FIG. 2 to be able to measure the optical performance of TFB 50. Proximity of the dopant species that produce gain in CPF 190 interferes with such measurements. As a consequence, it is generally desired to interpose an undoped structure, such as pigtail 150, between the CPF and the fiber bundle, rather than to splice the CPF directly to the bundle. Pigtail 150 also protects the fiber bundle from handling that could damage it.

Accordingly, it is typical for commercially available TFBs to be packaged with an undoped output pigtail such as pigtail 150, as well as an input pigtail (not shown) spliced to, or continuous with, the input end of fiber 70. The output pigtail typically has a core like that of a standard single-mode fiber, and is typically overcoated with a low-refractive-index polymer to provide the desired matching of outer waveguides that has been described above. The unfused end of each of the multimode fibers 70 also typically forms a pigtail which in use is optically coupled, e.g., to a semiconductor diode laser.

It is often desired to operate the CPF in a single mode. That is, signal light is desirably launched into the CPF solely in the fundamental core mode, or in a single higher-order mode (HOM) if the desired mode is a HOM. If required, a mode converter is readily used to convert between a fundamental mode and a HOM.

However, amplified spontaneous emission (ASE) in the gain medium of the CPF often produces amplified light at wavelengths other than the signal wavelength, or in modes other than the desired signal mode, or both. This light will in general travel in the CPF in both a co-propagating and a counter-propagating direction relative to the signal light. As noted above, such undesired emissions can propagate back into the fiber bundle and due to reflections at optical discontinuities can return to the gain medium, leading in the worst case to uncontrolled lasing.

As noted, such optical discontinuities include those at the input ends of MM fibers 100, an imperfect splice between the input pigtail and TFB input fiber 70, and an imperfect splice between output pigtail 150 and the CPF.

Moreover, if CPF 60 supports more guided core modes than TFB output pigtail 150, the core of pigtail 150 will be unable to capture all higher-order modes of the CPF. This will be true even if there is an optically perfect splice between the pigtail and the CPF. Light in modes not guided by core 160 of the pigtail will diffract out of the core and will instead be guided by the outer waveguide structure of the pigtail. From the viewpoint of ray optics, the modes escaping from the pigtail core will expand to occupy the entire diameter of the inner pigtail cladding 170 after propagating through a critical length $$L_{crit} = \frac{R_{outer\,cladding}}{NA_{CPF}},$$

wherein the numerator is the radius of the outer cladding, and the denominator is the numerical aperture of the inner waveguide of the CPF.

In typical arrangements, the critical length is only about 1 mm or at most a few millimeters. As a practical matter, therefore, the outer waveguide of the pigtail will in use often contain a substantial intensity distribution throughout its outer waveguide region. The multimode cores of fibers 100 of the TFB can capture this light, leading to undesired reflections as explained above.

Therefore, one way to suppress the undesired optical coupling into multimode fibers 100 is to optically couple the TFB directly to the CPF without the intervention of a TFB pigtail fiber. For example, the TFB could be fusion spliced directly to the CPF.

Let the index l denote a particular multimode pigtail of the TFB, and let the index m denote a particular higher-order mode of the CPF inner waveguide. Furthermore, let $R_{lm}$ denote the reflectivity of pigtail l for mode m, and let $K_{lm}$ denote the coupling constant that describes the bidirectional efficiency with which pigtail l captures the light in mode m and returns it to mode m after reflection and propagation back through the TFB and into the CPF. Then undesired spontaneous lasing will occur when the net unidirectional gain $G_m$ of CPF mode m is great enough to satisfy $G_m > (R_{lm} K_{lm})^{-1}$. Because of possible modal coupling by imperfect splices, $K_{lm}$ might be significant even for the fundamental mode of a CPF that supports only the fundamental or only a few modes.

To suppress undesired spontaneous lasing, we have sought, and found, ways to reduce the coupling coefficients $K_{lm}$.

One general approach to reducing the coupling coefficients $K_{lm}$ considers the light that was guided in all modes of the inner waveguide of CPF 60. To the extent feasible, all such light is confined to a region near the core of TFB output pigtail 150 and TFB center fiber 70 until it has propagated—to the left as viewed in FIG. 2—past taper 120 to the region where center fiber 70 physically and optically separates from multimode fibers 100. Such confinement will suppress the coupling of the light into the multimode fibers.

In one specific implementation of the general approach described above, pigtail 150 is modified to have the same refractive index profile as CPF 60. Thus, all modes of the CPF correspond respectively to modes of pigtail 150 and central fiber 70. One practical disadvantage of this approach, however, is that a single TFB design is unlikely to provide a sufficient optical match to every CPF of interest.

In a second specific implementation, pigtail 150 is dimensioned to support more core modes than CPF 60. This can be achieved, e.g., if pigtail 150 is sufficiently larger in at least one critical dimension than the inner waveguide of CPF 60. In one example, the critical dimension is the numerical aperture (NA) of the pigtail inner waveguide. In another example, the critical dimension is the pigtail core diameter. As noted above, it will often be the case that pigtail 150 will support more core modes than the CPF if the pigtail has a higher V number than the CPF.

This implementation will not generally provide a one-to-one mapping of CPF modes to pigtail modes. However, because the pigtail inner waveguide will support more modes than the CPF inner waveguide, it will generally be possible for the pigtail inner waveguide to guide all of the CPF inner waveguide modes. Such an arrangement will also enhance the capture of CPF inner waveguide modes by the pigtail inner waveguide.

Figure 3:
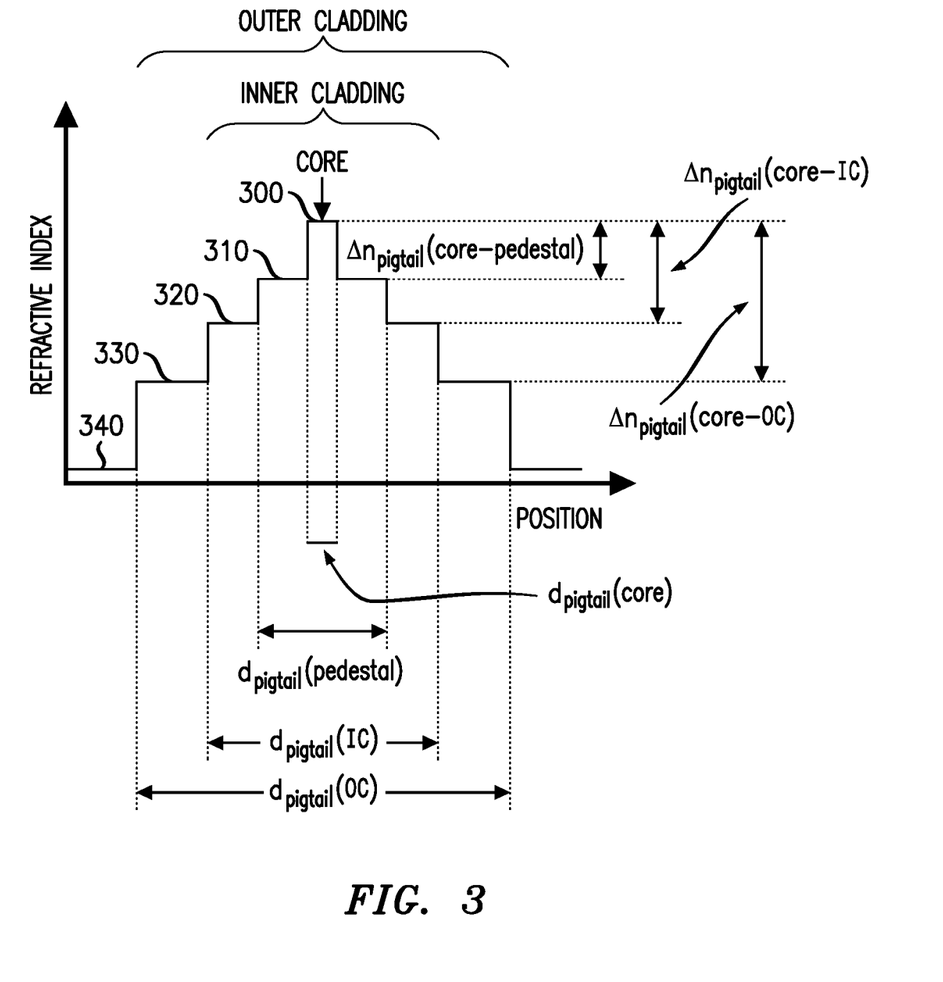
FIG. 3 is a refractive index profile of a TFB output pigtail modified, according to the invention in one embodiment, to reduce undesired reflective feedback into an optically coupled CPF amplifier.

A third specific implementation is illustrated in FIG. 3. As shown there, the refractive index profile of TFB output pigtail 150 includes core 300, inner cladding 320, and outer cladding 330. The refractive index 340 of the surrounding medium, typically air, is also indicated in the figure. Additionally, pigtail 150 is modified to include index region 310, concentric with and juxtaposed to core 300. Region 310 is referred to as the index pedestal. The refractive index of region 310 is intermediate between that of core 300 and inner cladding 320. It is thus greater than the refractive indices of both the inner and outer claddings. As a consequence, pedestal 310 defines an intermediary waveguide situated between the inner and outer waveguide structures of pigtail 150.

At least some of the light not strictly guided within the core of the pigtail will be confined by the intermediary waveguide to a region near the core. As a consequence, coupling into multimode fibers 100 will be at least partially suppressed. Such confinement may be achieved even when pigtail 150 has a strictly single-mode inner waveguide.

In order for pedestal 310 to achieve confinement sufficient to substantially reduce the coupling coefficients $K_{lm}$, it is desirable for pedestal diameter to be at least the core diameter of CPF 60, but no more than the outer diameter of center fiber 70 as reduced by tapering of the fiber bundle. For example, we suppose that a cluster of seven fibers, all originally of 125 micrometer outer diameter, is fused and tapered down to the diameter of one original fiber, i.e., to 125 micrometer outer diameter. In such a case, the taper will have a taper ratio of $\sqrt{7}=2.65$. Under those conditions, it would be undesirable for the pedestal diameter to exceed 125/2.65=47 micrometers. In fact, it would be advantageous to set the upper limit somewhat lower, to account for distortion of fiber 70 caused by the fusion process that forms the TFB.

Confinement may be further improved by imposing a constraint on the index difference $\Delta n_{pigtail}^{core-pedestal}$ between the pigtail core and the pedestal, and the index difference $\Delta n_{CPF}^{core-IC}$ between the CPF core and the CPF inner cladding. The constraint is that $\Delta n_{pigtail}^{core-pedestal}$ must be at least $\Delta n_{CPF}^{core-IC}$.

It should be noted that in some cases, the critical length may be less than the length of taper 120. In such cases, HOM light may couple into MM fibers 100 even though it has been confined near the core of pigtail 150 as described above. This may occur due to expansion of the mode field after light reaches the fused output end of the fiber bundle. If such expansion should cause the mode field to overlap with the cores of one or more of MM fibers 100, those MM fibers can capture the light and guide it.

One general approach for suppressing this expansion effect is to add an intermediary waveguide structure between the inner waveguide of center fiber 70 and the cores of MM fibers 100 to suppress the mode-field expansion in the taper region.

In one specific implementation of such an approach, an index pedestal, similar to that described above, is added to center fiber 70 of the fiber bundle and preferably also to the TFB output pigtail. It should be noted that some commercially available TFBs do in fact include an index pedestal juxtaposed to the core of the center fiber. However, those index pedestals of the prior art are designed to improve the mode matching between the TFB and its signal-input fiber, and between the TFB and its output pigtail. Such pedestals will not, in general, improve the confinement of HOM light as described above.

More specifically, the mode-matching pedestal serves at the input side of the TFB essentially as an inner cladding for the center fiber. However, the tapering process shrinks the dimensions of the center fiber. As a consequence, near the fused side of the TFB light will leak out of the core and will instead be guided by the pedestal. To be effective for mode matching, the pedestal should have, at the tapered and fused output side, a radius that matches the core of the CPF or of the TFB output pigtail. At the untapered, unfused input side, the center fiber core should match the signal input fiber to be spliced to the TFB.

On the other hand, a pedestal designed for purposes of confinement should be dimensioned such that the pedestal radius at the fused output end of the TFB is larger than the core of the CPF.

In particular, a TFB having a pedestal for mode matching could be modified by surrounding the mode-matching pedestal with a further, juxtaposed pedestal for confinement. The additional confinement pedestal should be bigger than the CPF core, and with its outer cladding should define a waveguide that supports more modes than the CPF core.

In at least some cases, it will be advantageous to provide confinement pedestals for both the TFB center fiber and the TFB output pigtail. It will be especially advantageous for the pedestal of the center fiber to be adapted to accept and guide all modes guided by the pigtail pedestal.

In general, for assemblies that include a TFB optically coupled to a CPF, it will be advantageous for any confinement pedestal to be adapted to guide light in more modes than the core of the fiber that immediately precedes it. In this regard, "precedence" is defined with respect to the propagation direction of the optical modes that are affected.

Figure 4:
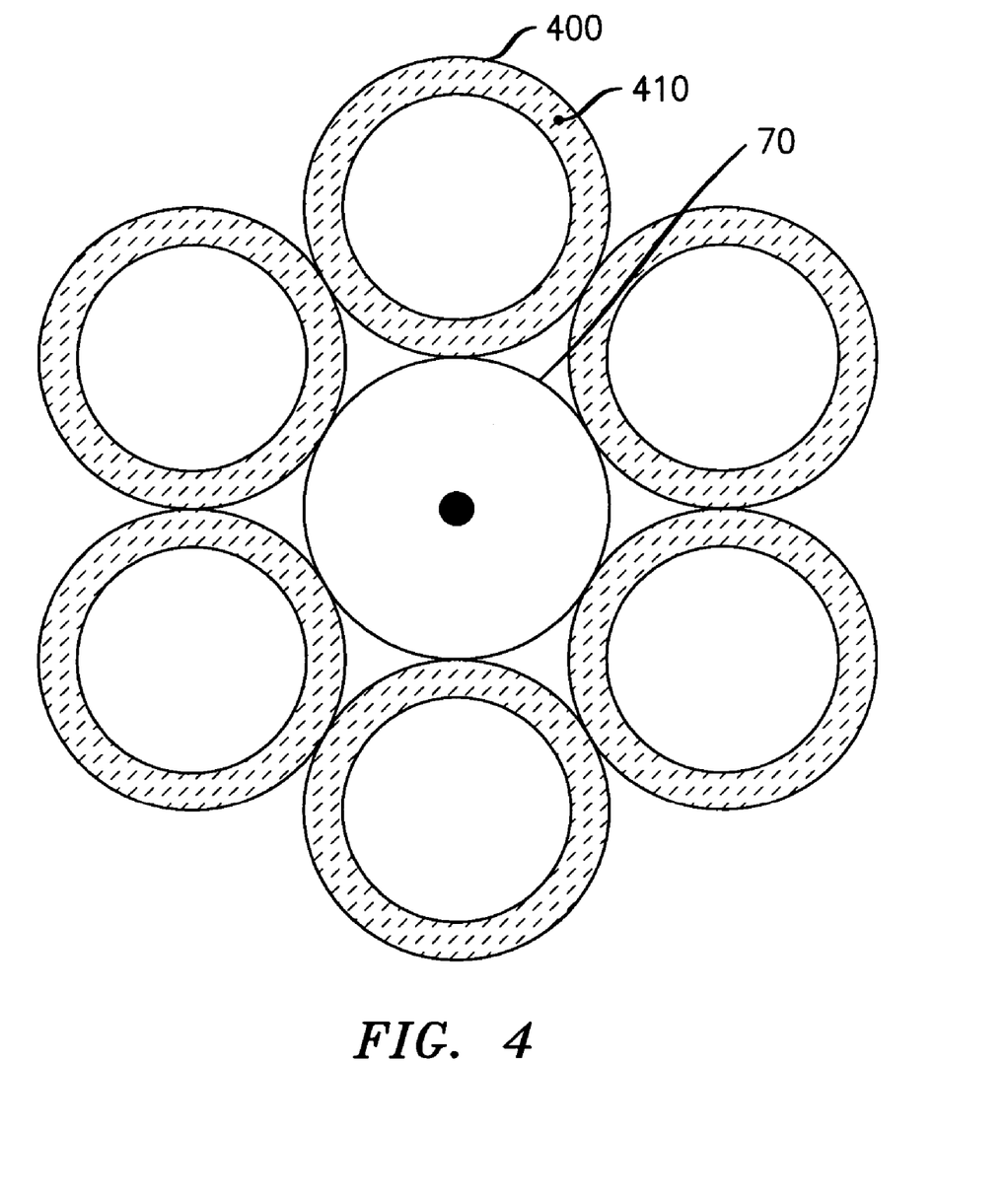
FIGS. 4 and 5 are cross sectional views of a TFB, respectively before and after fusion of its component fibers, modified, according to the invention in one embodiment, to reduce undesired reflective feedback into an optically coupled CPF amplifier.
Figure 5:
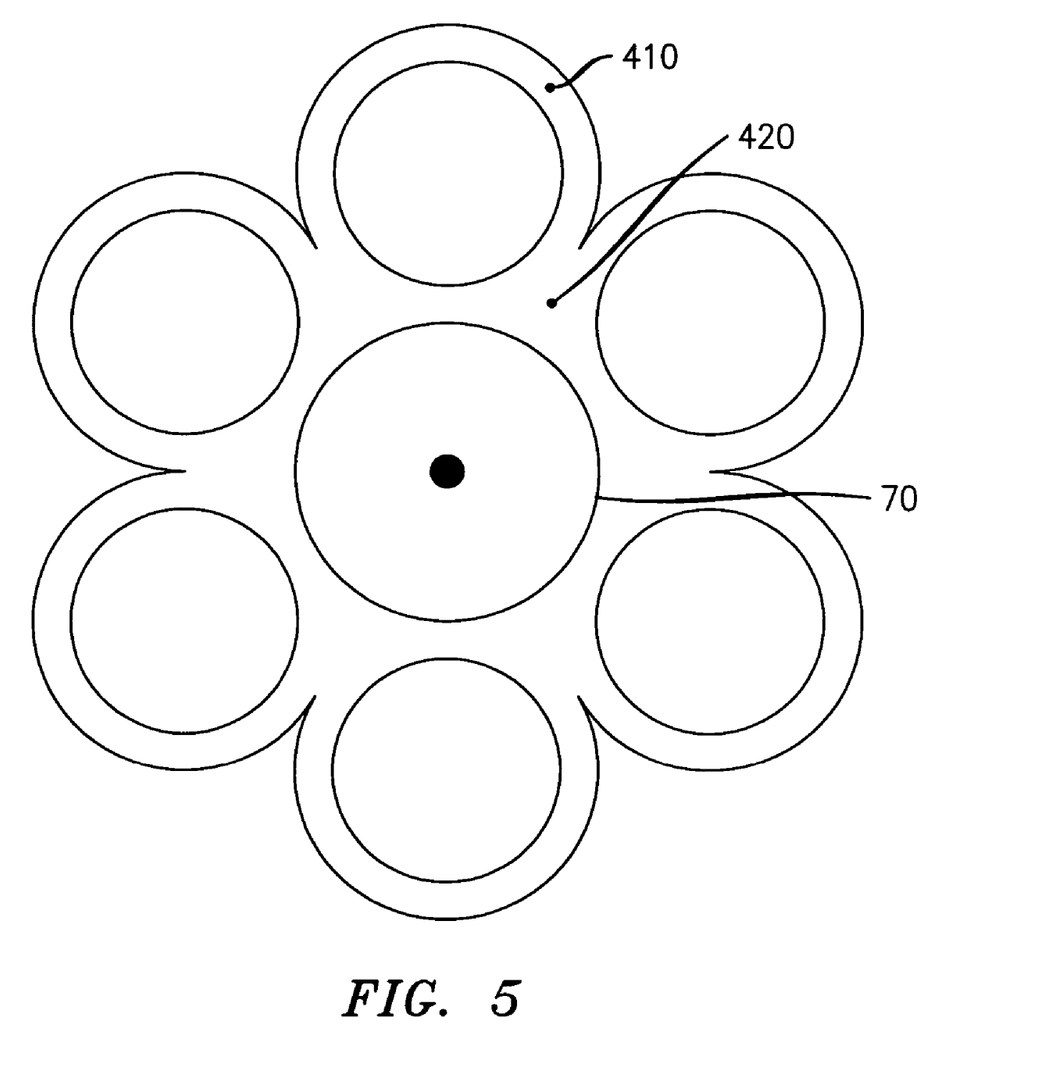

In a second specific implementation, an intermediary waveguide is provided in taper region 120 by the multimode fibers 100. In this regard, reference is made to FIG. 4, in which the MM fibers are now indicated by reference numeral 400, although the numeral 70 still indicates the TFB center fiber. In the arrangement of FIG. 4, each MM fiber 400 is provided with an outermost glass cladding 410. Advantageously, cladding 410 has a refractive index lower than that of the outermost glass region of center fiber 70. In the fusing process that forms the TFB, those portions of claddings 410 that adjoin fiber 70 will flow together to form an overcladding region 420 for fiber 70, as shown in FIG. 5.

If the refractive index of claddings 410, and thus of overcladding region 420, is less than that of the adjacent, underlying region of fiber 70, an intermediary waveguide structure will be defined that substantially confines light to the outermost portion or portions of fiber 70 and to a lesser extent to overcladding region 420. Such a waveguiding region will be defined only in taper region 120. Importantly, the resulting waveguiding region will suppress the coupling of light, and unguided core light in particular, from fiber 70 into the cores of MM fibers 400.

The resulting waveguiding region should be dimensioned to support more modes than the core of the CPF, and more modes than any extra pedestal waveguide present within the output pigtail fiber.

The index contrast needed to produce an effective intermediary waveguiding structure can be provided by various known methods. One such method is to use appropriate doping to depress the refractive index in the claddings of fibers 400. Such an approach may be combined with an increase in the thicknesses of the claddings of fibers 400 to further suppress coupling into the MM fiber cores. Alternatively, cladding region 410 may be an overcladding region that surrounds a higher-index inner cladding of the central fiber.

It should be noted in this regard that there are known MM fibers for use with pump diodes, in which the cladding refractive index is highly depressed, in order to increase the NA of the fiber. Incorporation of such fibers in a TFB may produce a low-index region such as region 420. However, such a region will generally lead to a waveguiding structure that is ineffective, or at best only partly effective, for suppressing the undesirable optical coupling described above.

For example, 100-micrometer-core, 0.165-NA MM fibers are often used in 125-micrometer 7:1 TFBs. Such fibers would provide an overcladding region less than 5 micrometers in thickness at the fused output of the TFB. This would lead to relatively little optical confinement by the resulting intermediary waveguiding structure, and the degree of confinement would be sensitive to small variations in the MM fiber characteristics.

More optical confinement could be provided if, e.g., the down-doped outer cladding of the MM fibers were made thicker by shrinking the multimode core or by increasing the outer diameter (OD) of the MM fiber. If the MM fiber is made larger in OD than the center fiber, fewer than six MM fibers will pack around the center fiber in direct, i.e., tangential, contact with it. In particular, the OD could be increased to the appropriate size for five instead of six MM fibers to pack precisely around the (smaller) center fiber, or both the MM fibers and the center fiber could be increased in OD.

More optical confinement could be provided, even in conventional fiber geometries, if the index contrast were increased between overcladding region 420 and the outer part of the center fiber. This could be achieved, e.g., by down-doping the MM cladding to further reduce the refractive index thereof, while also down-doping the MM core to the extent necessary to maintain the desired optical performance. Alternatively, appropriate up-doping could be used to raise the refractive index in every layer of the center fiber of the TFB, while maintaining such index steps as are necessary to maintain the desired optical performance.

EXAMPLE

We performed an experiment to demonstrate that CPF performance can be improved by suppressing the modal coupling effects described above. In our experiment, an erbium-ytterbium CPF amplifier was spliced at each end to a seven-fiber TFB to provide pump light that would both co-propagate and counter-propagate relative to the input signal. The CPF inner waveguide was designed to support several guided modes at the signal wavelength. A one-watt input signal was injected through the center fiber of one of the TFBs. A high-power diode laser injecting light into one MM fiber leg of each TFB provided up to 20 watts of pump power per TFB at 975 nm. The five unused MM fibers of each TFB were straight cleaved to provide a 4% Fresnel reflection at each end facet, in addition to the reflections at the pump diodes.

We increased the pump power until we observed sharp features in the spectral structure in the 1060-nm band ASE spectrum of the CPF amplifier. Such structure may indicate the onset of spontaneous lasing.

Figure 6:
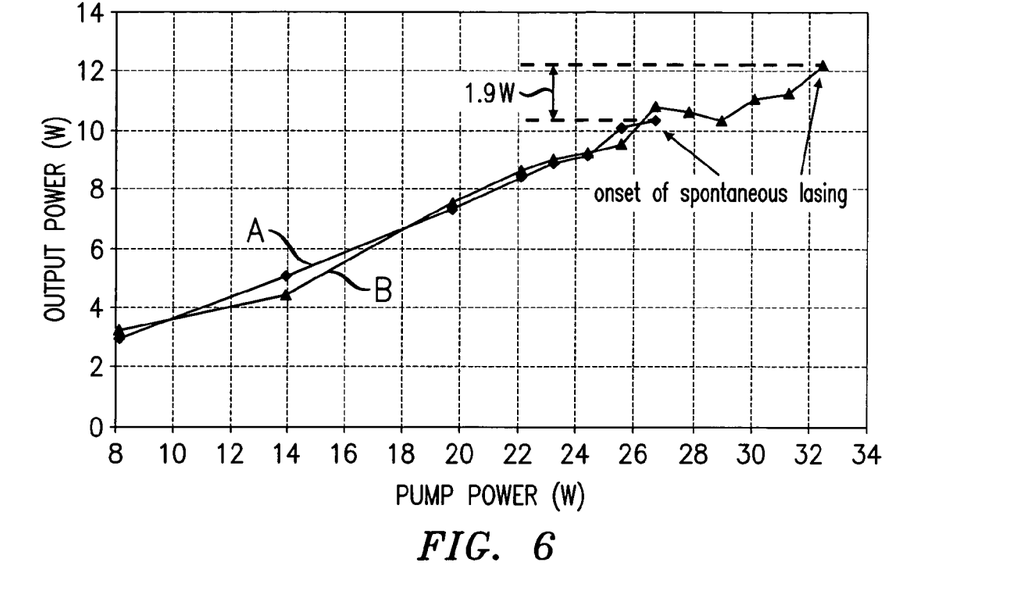
FIG. 6 is a plot of the output power of a CPF amplifier versus total pump power. Curve A of the figure represents an arrangement in which two commercially available TFBs are coupled to respective ends of the CPF through output pigtails having single-mode cores. Curve B of the figure represents a comparative arrangement in which the TFBs are coupled directly to the CPF without going through pigtails.
Figure 7:
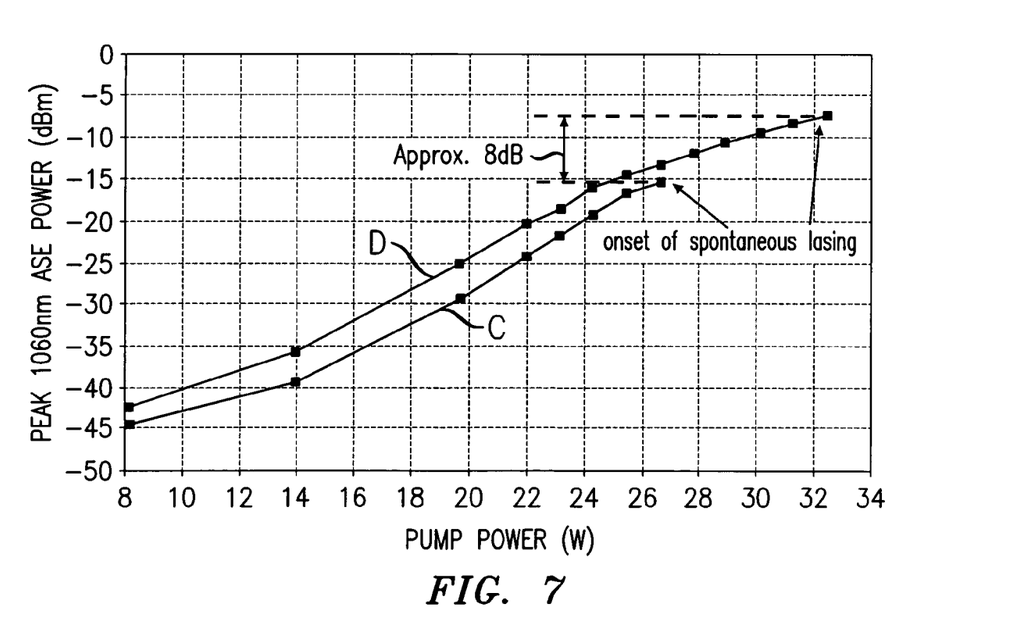
FIG. 7 is a plot of the peak power in the 1060-nm band ASE spectrum of the arrangements of FIG. 6, versus pump power. Curve C of the figure represents an arrangement in which two commercially available TFBs are coupled to respective ends of the CPF through output pigtails having single-mode cores. Curve D of the FIG. represents a comparative arrangement in which the TFBs are coupled directly to the CPF without going through pigtails.

Curve A of FIG. 6 plots the total output power of the CPF amplifier versus pump power. Curve C of FIG. 7 plots the peak power in the 1060-nm band ASE spectrum versus pump power. Both plots terminate at a combined pump power of about 26.7 watts, where the onset of spontaneous lasing was observed.

In the arrangement that led to curves A and C, commercially available TFBs were used with output pigtails having single-mode cores. The output pigtails were fusion spliced to the CPF.

In a comparative arrangement, the CPF was spliced directly to the fused output end of each TFB. In other words, no pigtail intermediated between either TFB and the CPF. Power measurements of the comparative arrangement led to curve B of FIG. 6 and curve D of FIG. 7, which for purposes of comparison correspond to curves A and C, respectively.

It will be seen from FIGS. 6 and 7 that in the arrangement that led to curves B and D, the onset of spontaneous lasing was observed at a combined pump power of about 32.2 watts.

A comparison of curves A and B shows that by eliminating the possibility of mode expansion in a pigtail between the CPF and a TFB, the total output power of the amplifier could be raised about 20% before spontaneous lasing was observed. Because the 1060-nm band ASE can serve as a measurement of amplifier gain in that band, a comparison of curves C and D shows that the 20% greater output power corresponded to about 8 dB of additional gain that could be tolerated before the onset of spontaneous lasing. This in turn implies that the arrangement of curves B and D reduced the effective reflectivity figure $R_{lm}K_{lm}$, as summed over the respective MM fibers l, by approximately 8 dB for the mode m that determined the spontaneous lasing threshold.

What is claimed is:

1. A method for operating a cladding-pumped fiber amplifier (CPFA) that is susceptible to an undesired optical propagation of radiation in higher-order core optical modes, comprising:
    (a) delivering optical pump radiation to the CPFA from a tapered fiber bundle having a plurality of multimode fibers clustered around a center fiber;
    (b) delivering an optical input signal to the CPFA, or extracting an amplified optical signal from the CPFA, via the center fiber of the tapered fiber bundle; and
    (c) during (a) and (b), suppressing the coupling of amplified optical radiation into the multimode fibers by confining amplified radiation from higher-order core optical modes of the CPFA in an optical waveguiding structure located in the tapered fiber bundle, the optical waveguiding structure including:
    at least an outer cladding, an inner cladding, an index pedestal, and a core, wherein the refractive index of the index pedestal is intermediate between that of the core and the inner cladding, wherein the refractive index of the outer cladding is less than the refractive index of the inner cladding, and wherein the index pedestal can act as an inner optical waveguide of the inner cladding, the suppression occurring due to the index pedestal acting as the inner optical waveguide for the higher-order optical modes that would otherwise propagate in the inner cladding.

2. The method of claim 1, wherein:
the coupling into multimode fibers is suppressed by a fiber region, denominated the refractive index pedestal.

3. The method of claim 1, wherein:
the tapered fiber bundle is optically coupled to the CPFA via an output pigtail fiber intermediate between the center fiber and the CPFA;
the output pigtail fiber has a core; and
the coupling into multimode fibers is suppressed by a fiber region, denominated a refractive index pedestal.

4. The method of claim 1, wherein:
the tapered fiber bundle has a portion in which the multimode fibers are fused to the center fiber;
the tapered fiber bundle includes an output pigtail fiber able to guide light in at least one wavelength range;
in the fused portion, the center fiber and MM fiber portions adjacent thereto collectively define a waveguide; and
the coupling into multimode fibers is suppressed by said waveguide.

5. The method of claim 1, wherein:
the tapered fiber bundle is optically coupled to the CPFA via an output pigtail fiber intermediate between the center fiber and the CPFA;
the output pigtail fiber has a core;
the CPFA and the pigtail fiber are each capable of guiding amplified signal radiation in one or more core modes, and the pigtail fiber supports more of said core optical modes than does the CPFA; and
the coupling into multimode fibers is suppressed by coupling the higher-order core optical modes into the pigtail fiber core.

* * * * *